3,196,024
METHOD OF PRODUCING FOAMED SODIUM CHLORIDE OF LOW BULK DENSITY
James Saunders, Edinburgh, Scotland, assignor to Cerebos Limited, London, England, a British company
No Drawing. Filed Oct. 26, 1962, Ser. No. 233,430
Claims priority, application Great Britain, Nov. 2, 1961, 39,328/61
9 Claims. (Cl. 106—122)

This invention relates to a process for the production of crystalline material of low bulk density.

Many crystalline substances exhibit a tendency to agglomerate or cake on storage, often by the agency of atmospheric moisture which, by forming surface solutions and then re-evaporating, often causes the crystals to be cemented together. It is frequently possible to reduce the caking-tendency of crystalline material by causing the individual crystals to assume irregular shapes, thereby preventing close contact between flat crystal surfaces and so reducing cementation. This more open packing is reflected in the bulk density of the product and in general crystalline material in a low bulk-density form is less susceptible to caking than in a form having higher bulk density.

Common salt, sodium chloride, is produced commercially in a number of crystalline forms, principally as open-pan salt and so-called vacuum salt. Open pan salt is formed by the evaporation of brine in shallow pans which are open to the atmosphere at the top and are generally heated from below. This system causes the brine at the surface to concentrate, the crystals tending to grow from below in an irregular manner until their weight overcomes the surface tension supporting them and they sink to the bottom of the pan. The irregular shape of the crystals causes them to pack together badly and open pan salt is characterised by low bulk density, for example, about 0.7 gm./cc. The open pan production of salt is however expensive to operate.

Vacuum salt is formed by evaporating brine in multiple effect vacuum evaporators, the brine being initially purified for example to remove calcium and magnesium ions which would otherwise cause scaling inside the evaporators. This method normally produces salt in the form of small cubic crystals which, by packing together well, tend to give a product of high bulk density, for example, 1.0 gm./cc. This type of process is generally more economical than the open-pan process and is widely used commercially.

We have now found that cubically crystalline salt particularly vacuum salt can be given a low bulk density similar to that of open pan salt if the salt crystals are suspended in brine which is formed into a foam preferably stabilised by incorporation of a foam stabiliser. The foam may then be dried and subdivided into particles which consist of irregularly shaped particles having bulk properties comparable with those of open pan salt. Alternatively the foam may be moulded or extruded into blocks of any desired shape and dried, the resultant blocks being used for example to produce so-called "cut-lump" salt.

The use of foam appears to prevent the cubic salt from agglomerating in a close compact manner. It is also possible to form similar low bulk density salt from forms of salt other than cubic salt, for example waste open pan or vacuum salt in which the crystals have been broken into small particles.

Other salts such as ammonium chloride and ammonium nitrate may also be subjected to the process according to the invention to give a low bulk density product, as also may organic solid material, particularly those of a crystalline nature such as sugar. In general, the present process is preferably applied to particulate solid materials having an average particle size of from 0.1–1 mm.

According to one feature of the present invention, therefore, we provide a process for reducing the bulk density of a particular solid material, particularly common salt which comprises forming a foam carrying the solid material in suspension, the foam then being dried to remove unwanted liquid and sub-divided into particles.

According to another feature of the invention we provide a process for the production of low bulk density masses of crystalline salts particularly common salt which comprises forming a foam carrying the crystalline salt in suspension, the foam being thereafter moulded or extruded to the desired shape and dried.

The foam may be formed, for example, by vigorous agitation in a gas atmosphere, e.g. whisking in air, of a liquid conveniently water, preferably containing a foam stabiliser, or a gas such as air may be bubbled through the liquid. The gas used may be at, above or below atmospheric pressure. The foam may also be produced by gas generated by gas-producing chemical substances such as sodium bicarbonate or ammonium bicarbonate. The solid material may be dispersed in the foam after formation thereof but is preferably present as a suspension in the liquid during the foaming step in order to simplify the procedure.

If the solid material is in contact with the liquid for a sufficient time, the material if soluble will normally dissolve to give a saturated solution. In the case of soluble materials, it is generally preferred to use a saturated solution of the material initially, in order to avoid changes of concentration during processing which may otherwise affect other factors such as foam stability. It will be appreciated that the foam stabiliser where used must be one active in such saturated solutions and where the concentration of the solution at saturation is high, many conventional foam stabilisers are ineffective.

Thus, for example, where the solid material is common salt and the liquid forming the foam is water, the saturated solution formed is of high concentration and ionic strength so that many such foam stabilisers as carboxymethylcellulose, albumens etc. have little or no stabilising activity. We have found, however, that gelatine is active in saturated brine and it is preferred, therefore, to use this substance as foam stabiliser where saturated brine is used. With non-polar materials e.g. sugar and insoluble salts a wider range of foam stabilisers including carboxymethylcellulose, egg albumen and milk albumen may be used.

The proportions of solid material, liquid and foam stabiliser which give best results depend upon the nature of the materials used. In general the preferred weight ratio of liquid to solid material lies between 8:92 and 18:82, more advantageously between 12:88 and 16:84. The optimal ratio of foam stabilisers to solid material tends to vary with the liquid/solid ratio and the nature of the foam stabiliser and where the foam stabiliser is gelatine the preferred ratio of gelatine to solid material lies between 0.03:99.97 and 0.50:99.50 when the liquid/solid ratio is about 8:92 and between 0.25:99.75 and 1.0:99.0 when the liquid solid ratio is about 18:82.

My copending U.S. application Serial No. 233,429, filed of even date herewith, describes a process in which dendritic salt which is of low hygroscopicity, can be made to assume one of the advantageous bulk properties of open pan salt namely high angle of repose by introducing onto the surface of the salt crystals a humectant substance such as magnesium or calcium chloride or polyhydric alcohols such as glycerol, sorbitol, etc. We have found that the treatment of low bulk density salt obtained according to the present invention, with a humectant enables the salt to imitate many of the valuable properties of open pan salt to an extent not hitherto achieved. Magnesium chloride is the preferred humectant.

In the present process the humectant may be applied to the surface of the solid salt, e.g. by spraying, in the form of an aqueous solution or dispersion after drying and preferably sub-division of the foam but may also be incorporated in the saturated brine used to produce the foam. A concentration of from 0.05 to 1% conveniently 0.1%–0.5% by weight of humectant based upon the solid salt is preferably used.

The process according to the invention enables the bulk density of particulate common salt to be reduced from a relatively high value of about 1.0 gm./cc. down to 0.6 to 0.75 gm./cm. or even lower. The foam in the wet or dry state is generally of lower bulk density in the lump form than in the particulate form achieved by breaking up the dry foam and in order to produce particulate salt of bulk density 0.6 to 0.8 gm./cc. the wet foam should have a bulk density of about 0.5 gm./cc. In general it is possible to use the bulk density of the wet foam to determine when the foaming stage has reached completion.

In the production of particulate material the foam can be dried during or after sub-division. For example the wet foam may be subjected to a jet or jets of a hot gas e.g. air which breaks up the foam into particles at the same time drying the latter. Alternatively, the wet foam may be sub-divided e.g. by flicking the surface with revolving blades, the particles then being dried with a hot gas. In another procedure the wet foam may be layed out in trays in a suitable drying apparatus and dried in a current of warm air. In large scale production it is advantageous to dry continuously on a belt. Where the foam is dried without sub-division it may subsequently be broken up by any convenient gentle size reduction process which serves to reduce the particle size to the desired value without however reducing the crystals to their ultimate cubic form. The size reduction may for example be effected by gentle cog-milling to give for example particles similar in dimensions to those of open pan salt.

In the application of the present process to the production of particulate common salt it is generally preferred to produce particles of a particle size of from 0.1 to 1.5 mm.

As stated above in accordance with one feature of the process according to the invention the wet foam can be moulded into desired shapes before drying. In particular, open pan salt is often sold in the form of cut lumps prepared by sawing up caked masses, and the present process affords a simple means of producing a similar product. Since moulding is employed, the waste originating from a sawing step is avoided. Other desirable shapes may be obtained, if desired, and the foam may be extruded rather than moulded.

Moulded shapes can also be obtained from the particulate material produced in accordance with the invention, and for example in the production of lump salt this can be more economical than the direct moulding of the wet foam. The dry particulate material may thus be damped slightly, moulded to the desired shape under pressure and then dried.

In order that the invention may be well understood we give the following examples by way of illustration only:

*Example 1*

10 kg. of sodium chloride salt are added gradually to 3 kg. of a saturated solution of sodium chloride containing 50 g. of magnesium chloride and 30 g. of gelatine, also in solution. The brine is contained in a whisking bowl capable of being agitated at varying speeds of whipping. Whilst the sodium chloride salt is being added the mass is mixed relatively slowly. When all the sodium chloride salt has been added the whipping speed is increased to around 600 r.p.m. and continued for 5 minutes. At the end of this time the foam has a bulk density of about 0.5 g. per cc. The foam is then spread on a tray and placed in a drier whereby a current of air of relatively high velocity is passed over the tray at a temperature of about 120° C. After two hours the product is quite dry and is passed through toothed, contra-rotating, breaking rollers. The resultant salt is found to simulate various of the properties of open pan salt particularly as to low bulk density and high angle of repose. If the magnesium chloride is omitted from the procedure described the salt obtained still possesses advantageous bulk properties particularly low bulk density.

*Example 2*

1.5 kg. of ammonium chloride is added gradually to 160 ml. of a 3.5% solution of gelatine in water, contained in a whisking bowl. Whilst the ammonium chloride is being added the mass is mixed gently but after the addition is complete the mixture is whisked for 7 minutes at 400 r.p.m. At the end of this time the foam has a bulk density of 0.45 gm./cc. The foam is transferred to an aluminium mould with internal dimensions of 4.25" x 4.25" x 9". The mould containing the foam is heated in a blast of warm air at 100° C. for 2 hours, by which time it has been substantially dried. The block may then be removed from the mould. The block so formed has a bulk density of 0.5 g. per cc.

*Example 3*

10 kg. of sugar, of average particle size 0.35 mm., are gradually added to 3 kg. of saturated solution containing 40 g. of dried egg albumen, also in solution. The solution is contained in a whisking bowl capable of being agitated at various speeds of whipping. Whilst the sugar is being added, the mass is mixed relatively slowly and when it has all been added the whipping speed is increased to 600 r.p.m. At the end of this time the foam has a bulk density of 0.5 g. per cc. The foam is then spread on a tray and placed in a dryer whereby a current of air of relatively high velocity is passed over the tray at a temperature of about 100° C. After two hours the product is substantially dry but contains a proportion of amorphous material which is allowed to crystallise by standing for two hours before passing the mass through toothed, contra-rotating, breaking rollers. Whilst passing in a "stream" through the breaking rollers, the product is sprayed with a total of 40 g. of glycerine dissolved in 80 ml. of water. The product has a high bulk density and a high angle of repose.

*Example 4*

1.5 kg. of ammonium nitrate are added gradually to 160 ml. of a 3.5% solution of gelatine in water, contained in a whisking bowl. Whilst the ammonium nitrate is being added the mass is mixed gently but after the addition is complete the mixture is whisked for 7 minutes at 400 r.p.m. At the end of this time the foam has a bulk density of 0.45 g./cc. The foam is transferred to an aluminium mould with internal dimensions of 4.25" x 4.25" x 9". The mould containing the foam is heated in a blast of warm air at 100° C. for 2 hours, by which time it has been substantially dried. The block may then be removed from the mould. The block so formed has a bulk density of 0.50 g./cc.

Alternatively, the foam may be spread on a tray, dried in a current of air and broken up by passing through toothed, contra-rotating, breaking rollers as described in Example 1. The product thus obtained has a high bulk density and a high angle of repose.

Example 5

1.5 kg. of barium sulphate is added gradually to 160 ml. of a 3.5% solution of carboxymethyl cellulose in water, contained in a whisking bowl. Whilst the barium sulphate is being added the mass is mixed gently but after the addition is complete the mixture is whisked for 7 minutes at 400 r.p.m. At the end of this time the foam has a bulk density of 0.55 g./cc. The foam is transferred to an aluminium mould with internal dimensions of 4.25" x 4.25" x 9". The mould containing the foam is heated in a blast of warm air at 100° C. for 2 hours, by which time it has been substantially dried. The block may then be removed from the mould. The block so formed has a bulk density of 0.60 g./cc.

Alternatively, the foam may be spread on a tray, dried in a current of air and broken up by passing through toothed, contra-rotating, breaking rollers as described in Example 1. The product thus obtained has a high bulk density and a high angle of repose.

Example 6

1.5 kg. of ammonium sulphate is added gradually to 160 ml. of a 3.5% solution of gelatine in water, contained in a whisking bowl. Whilst the ammonium sulphate is being added the mass is mixed gently but after the addition is complete the mixture is whisked for 7 minutes at 400 r.p.m. At the end of this time the foam has a bulk density of 0.45 g./cc. The foam is transferred to an aluminium mould with internal dimensions of 4.25" x 4.25" x 9". The mould containing the foam is heated in a blast of warm air at 100° C. for 2 hours, by which time it has been substantially dried. The block may then be removed from the mould. The block so formed has a bulk density of 0.65 g./cc.

Alternatively, the foam may be spread on a tray, dried in a current of air and broken up by passing through toothed, contra-rotating, breaking rollers as described in Example 1. The product thus obtained has a high bulk density and a high angle of repose.

Example 7

1.0 kg. of acetylsalicyclic acid is added gradually to 110 ml. of a 3.5% solution of gelatine in water, contained in a whisking bowl. Whilst the acetylsalicylic acid is being added the mass is mixed gently but after the addition is complete the mixture is whisked for 7 minutes at 400 r.p.m. At the end of this time the foam has a bulk density of 0.55 g./cc. The foam is transferred to an aluminium dish and is then dried in a vacuum oven with a shelf temperature of 40° C. and a vacuum of 73 cms. The dried foam is then coarsely milled to an average particle size of 0.25 mm.

Example 8

15 kg. of sodium chloride salt are added gradually to 4.5 kg. of a saturated solution of sodium chloride containing 60 gms. of gelatine, also in solution. The brine is contained in a whisking bowl capable of being agitated at varying speeds of whipping. Whilst the sodium chloride salt is being added the mass is mixed relatively slowly. When all the sodium chloride salt has been added the whipping speed is increased to around 600 r.p.m. and continued for 5 minutes. At the end of this time the foam has a bulk density of about 0.5 g. per cc.

The foam is discharged from the whisking bowl into a short worm conveyor which causes it to be passed via a system of paddles and orifices, the former revolving at high speed, into a duct along which hot dry air is moving at high velocity in a direction of right angles to the direction of entry of the fragments of foam. The foam is carried along in the hot air and is thereby dried and then discharged via a collecting box.

I claim:

1. A process for the production of sodium chloride of relatively low bulk density from cubically crystalline sodium chloride of relatively high bulk density, which process comprises forming an aqueous foam containing particulate cubically crystalline sodium chloride and a foam stabilizer in suspension and then drying and thereafter sub-dividing the dried foam to form particles of sodium chloride of relative low bulk density.

2. A process according to claim 1 wherein the aqueous foam is subjected to the action of jets of a hot gas to break up the foam into particles and dry the particles.

3. A process according to claim 1 wherein the sodium chloride is treated with 0.05 to 1% by weight of a humectant substance to increase the angle of repose of the dried product.

4. A process according to claim 3 wherein a solution of a humectant selected from the group consisting of magnesium chloride, calcium chloride, glycerol and sorbitol is applied to the surface of the dried product after drying of the foam.

5. A process according to claim 3 wherein a humectant selected from the group consisting of magnesium chloride, calcium chloride, glycerol and sorbitol is incorporated in the aqueous foam.

6. A process according to claim 3 wherein the weight ratio of liquid to solid material in the foam lies between 8:92 and 18:82.

7. A process according to claim 6 wherein the particulate product has an average particle size of between 0.1 mm. and 1.5 mm.

8. A process for the production of sodium chloride of relatively low bulk density from cubically crystalline sodium chloride of relatively high bulk density, which process comprises (A) forming a gelatine-stabilized foam containing particulate cubically crystalline sodium chloride in suspension from a saturated aqueous solution of sodium chloride, and (B) drying and thereafter subdividing the dried foam to form particles of sodium chloride of relatively low bulk density.

9. A process according to claim 8 wherein the weight ratio of liquid to solid material in the foam lies between 12:88 and 16:84.

References Cited by the Examiner

UNITED STATES PATENTS

| | | | |
|---|---|---|---|
| 2,337,915 | 12/43 | Menger | 106—122 |
| 2,371,707 | 3/45 | Rainier | 106—122 |
| 2,837,440 | 6/58 | Boivin | 106—122 |
| 2,913,769 | 11/59 | Kastli | 106—122 |

FOREIGN PATENTS 265,968  12/27  Great Britain.

ALEXANDER H. BRODMERKEL, *Primary Examiner.*

MORRIS LIEBMAN, *Examiner.*